United States Patent

Basstein et al.

[11] Patent Number: 5,845,533
[45] Date of Patent: Dec. 8, 1998

[54] GEAR TRANSMISSION OF A CYLINDRICAL PINION WITH A FACE GEAR, FACE GEAR USED IN SAID TRANSMISSION AND METHOD AND TOOL FOR MAKING THE FACE GEAR

[75] Inventors: Augustinus F.H. Basstein, Prinsenbeek; Anne Lourens Sijtstra, Rotterdam; Gustaaf A. Uittenbogaart, Overeen, all of Netherlands

[73] Assignee: Crown Gear B.V., Enschede, Netherlands

[21] Appl. No.: 844,231

[22] Filed: Apr. 18, 1997

Related U.S. Application Data

[63] Continuation of PCT/NL95/00360, Oct. 18, 1995, published as WO96/12585, May 2, 1996.

[30] Foreign Application Priority Data

Oct. 19, 1994 [NL] Netherlands ............................ 9401735

[51] Int. Cl.$^6$ .............................. F16H 55/06; F16H 1/12
[52] U.S. Cl. ................................... 74/462; 74/416; 74/420
[58] Field of Search .............................. 74/462, 457, 527, 74/459, 417, 416, 420

[56] References Cited

U.S. PATENT DOCUMENTS

| | | | |
|---|---|---|---|
| 2,176,956 | 11/1939 | Cook et al. | 74/462 |
| 2,669,904 | 2/1954 | Bloomfield et al. | 90/1.6 |
| 2,747,424 | 5/1956 | Osplack et al. | 74/459.5 |
| 3,184,988 | 5/1965 | Osplack et al. | 74/457 |
| 4,051,745 | 10/1977 | Ishikawa | 74/462 |

FOREIGN PATENT DOCUMENTS

| | | |
|---|---|---|
| A282784 | 7/1929 | United Kingdom . |
| WO 92/09395 | 6/1992 | WIPO . |
| WO 92/11967 | 7/1992 | WIPO . |

OTHER PUBLICATIONS

AGMA Technical Paper 93FTM7, Oct. 1993, Alexandria, Virginia (US) pp. 1–12; G. Basstein et a Basstein et al. "New Development in Design, Manufacturing and Applications of Cylkro–(Face) Gears".

G. Hofsteded et al. Machineonderdelen, 17th Edition. 1962, Mmorks Drukkerij En Uitgeverij NV, Dordrecth. pp. 328–329, Section 2.

*Primary Examiner*—Rodney H. Bonck
*Assistant Examiner*—Marcus Charles
*Attorney, Agent, or Firm*—Deveau, Colton & Marquis

[57] ABSTRACT

In a face gear transmission with a cylindrical pinion and a face gear meshing therewith the toothing of the face gear is derived from a theoretical profile (22) of a pinion with an infinitely small thickness by moving the centre of this pinion along an imaginary axis which the coincides with the axis of rotation of the cylindrical pinion. The teeth of the face gear are crowned so as to achieve the required tooth clearance. The shape of the teeth of the face gear is such that upon the movement of the theoretical pinion profile (22) in the direction of the imaginary axis of rotation, starting from a defined diameter between the maximum and the minimum diameter of the toothing of the face gear, the centre of the theoretical pinion profile undergoes a displacement ($P_1$, $P_2$) at the same time at right angles to the imaginary axis of rotation in the direction towards the toothing of the face gear.

7 Claims, 7 Drawing Sheets

1

GEAR TRANSMISSION OF A CYLINDRICAL PINION WITH A FACE GEAR, FACE GEAR USED IN SAID TRANSMISSION AND METHOD AND TOOL FOR MAKING THE FACE GEAR

This is a continuation of co-pending International Application PCT/NL95/00360 Oct. 18, 1995.

BACKGROUND OF THE INVENTION

1. Field of the Invention

The invention relates to a gear transmission for coupling in a fixed ratio a rotation of a first axis of rotation to a rotation of a second axis of rotation

2. Description of Prior Arts

Such a gear transmission is known and is described in, for example, Technical Paper No. 93FTM7, drafted by the Applicants and published by the American Gear Manufacturers Association (AGMA).

According to page 6 of that publication, the tooth clearance considered necessary can be achieved by crowning the pinion. This method of achieving tooth clearance has the disadvantage that the adjustment of face gear and cylindrical pinion is influenced by the axial position of the cylindrical pinion, with the result that a major advantage of the face gear transmission, namely the possibility of positioning the pinion freely in the axial direction, disappears.

The other method described in this publication for achieving tooth clearance is the use of a cylindrical pinion which has a maximum of three teeth fewer than the theoretical pinion profile. However, the tooth clearance arising in the direction of the teeth as a result of this is not constant over the full tooth height and cannot be influenced by the design engineer. Nor can the curvature in the direction of the teeth be influenced by the design engineer, because said curvature follows directly from the numbers of teeth of the cylindrical pinion and the theoretical pinion profile.

SUMMARY OF THE INVENTION

The object of the invention is to provide a gear transmission in which, through measures which are simple and cheap to carry out, the design engineer can select the tooth clearance which occurs, in order to obtain the most advantageous load pattern, said tooth clearance being independent of the axial position of the cylindrical pinion, so that the assembly of a cylindrical pinion and a face gear is simple to carry out.

This object is achieved by a gear transmission for coupling in a fixed ratio a rotation of a first axis of rotation to a rotation of a second axis of rotation, the first axis of rotation and the second axis of rotation forming an angle $\delta$ with each other, by means of a cylindrical pinion disposed on the first axis of rotation and having a tooth angle $\beta$, and a face gear disposed on the second axis of rotation and meshing with the cylindrical pinion, said face gear being provided with a toothing which runs from a minimum diameter $D_{min}$, where the toothing has a profile with a minimum pressure angle $\alpha_{min}$, to a maximum diameter $D_{max}$, where the profile has a maximum pressure angle $\alpha_{max}$, and which toothing is derived from a theoretical profile of an infinitely thin cross-section by moving a center point of said profile along an imaginary axis of rotation, corresponding to the first axis of rotation, in a plane which comprises the imaginary axis of rotation and which is parallel to the second axis of rotation, and at the same time rotating said pinion profile according to an angle which follows from said movement and the tooth angle $\beta$ of the pinion, and in which, if the toothing of the pinion and the toothing of the face gear rest against each other at the position of a defined diameter $D_d$ of the face gear, a first tooth clearance ($a_1$) occurs between said toothing systems at the position of the minimum face gear diameter $D_{min}$, and a second tooth clearance ($a_2$) occurs at the position of the maximum face gear diameter $D_{max}$, wherein the tooth clearance occurs due to the fact that the shape of the toothing of the face gear is adapted in such a way that when the infinitely thin theoretical pinion profile which is in mesh with the toothing of the face gear is moved in the direction of the imaginary axis of rotation, starting from the defined diameter $D_d$, the center point of the theoretical pinion profile undergoes a displacement at the same time in the plane at right angles to the imaginary axis of rotation in the direction towards the toothing of the face gear.

Crowning the toothing of the face gear, in the case of which at the theoretically correct angle $\delta$ between the axes the flanks of the cylindrical pinion and the face gear are in contact at a defined diameter of the face gear, ensures that the adjustment of the gear transmission is not influenced by the axial position of the pinion. This also means that the desired tooth clearance can be achieved at any diameter of the face gear toothing, and deviations in the angle between the axes have as little influence as possible on the tooth clearances. Moreover, it is simpler to adjust the toothing during assembly in the gear casing.

A further improvement is achieved by providing tooth clearance which does not depend on the special shape of the toothing of the face gear, and in particular on the pressure angle. This makes it possible to define the course of the tooth clearance over the width of the toothing in a simple way, in particular by specifying the shape of the profile and the tooth clearances of the maximum and minimum diameters.

For this purpose, the profile of the face gear is designed such that the displacement of the theoretical pinion profile during movement from the defined diameter $D_d$ to the maximum diameter $D_{max}$ of the face gear is approximately $1/\sin(\alpha_{max})$ times the second tooth clearance ($a_2$), and during movement to the minimum diameter $D_{min}$ of the face gear is approximately $1/\sin(\alpha_{min})$ times the first tooth clearance ($a_1$).

It appears that the movement at right angles to the direction of the axis of rotation of the pinion with the theoretical profile which is necessary to achieve tooth clearance depends also on the pressure angle of the profile of the face gear. At the same value of the desired tooth clearance, this movement at the inside diameter of the face gear is, for example, four times that at the outside diameter. This ensures that the tooth clearance is distributed predictably, for example symmetrically, over the width of the face gear.

Another object of the invention is to provide a face gear which can be assembled in a simple manner with a cylindrical pinion, while the axial position of the pinion does not have any influence on the meshing, and while the adaptations can be made in the manner desired by the design engineer.

This object is achieved by a face gear which can mesh with a cylindrical pinion with a tooth angle $\beta$, said face gear being provided with a toothing which runs from a minimum diameter $D_{min}$ where the toothing has a profile with a minimum pressure angle $\alpha_{min}$, to a maximum diameter $D_{max}$, where the toothing has a profile with a maximum pressure angle $\alpha_{min}$, and which toothing is derived from a theoretical pinion profile rotating about an imaginary axis of rotation and corresponding to the toothing of the cylindrical pinion with which the face gear can mesh, wherein the shape of the toothing of the face gear is such that an infinitely thin cross-section of the theoretical pinion profile remains in mesh with the toothing if the centre of said theoretical pinion profile lying on the imaginary axis of rotation moves in a plane, in which the imaginary axis of rotation lies and which is parallel to the axis of rotation of the face gear, from the position at which meshing at a defined diameter $D_d$ on the face gear occurs in the direction of the imaginary axis of rotation, and during that rotates through an angle corresponding to said movement, which angle is determined by the movement and the tooth angle $\beta$, and at the same time moves over a distance $(P_1, P_2)$ in the direction towards the toothing of the face gear at right angles to the imaginary axis of rotation.

Crowning the toothing of the face gear ensures that the adjustment of the gear transmission is not influenced by the axial position of the pinion. This means that the desired tooth clearance can be achieved at any diameter of the face gear toothing.

Still another object of the invention is to provide a method by which corrections are simple to make in a face gear, which ensure that the face gear in a gear transmission can mesh in the optimum manner with a cylindrical pinion.

This object is achieved by a method for machining, with a rotating tool rotating about a first axis of rotation, a workpiece rotating about a second axis of rotation to the form of a face gear which can mesh with a cylindrical pinion, in which the face gear is provided with a toothing which runs from a minimum diameter $D_{min}$, where the toothing has a profile with a minimum pressure angle $\alpha_{min}$, to a maximum diameter $D_{min}$, where the toothing has a profile with a maximum pressure angle $\alpha_{max}$, and which toothing is derived from a theoretical pinion profile rotating about an imaginary axis of rotation and corresponding to the toothing of the cylindrical pinion, with which the face gear can mesh, while the workpiece is machined by cutting edges which are disposed on an outer periphery of the tool and are derived from the theoretical pinion profile, and which cutting edges are disposed in such a way that a center point of the cutting edges corresponding to the center point of the theoretical pinion profile lies on a circle around the center point of the tool lying on the first axis of rotation, while the tool follows such a path along the workpiece that when the workpiece is being machined to a defined diameter $D_d$ the circle with the centre points of the cutting edges intersects a plane, in which plane the imaginary axis of rotation lies, and which is parallel to the second axis of rotation, wherein during the movement from the position where the tool is machining the defined diameter $D_d$ to the minimum diameter $D_{min}$ or to the maximum diameter $D_{max}$ the intersection of the plane and the circle undergoes an increasing displacement in the direction towards the toothing relative to the imaginary axis of rotation.

The workpiece acquires the desired shape, determined by the design engineer, if the position of the centre corresponding to the theoretical pinion profile of the machining surface of the tool which is in contact with the workpiece is moved towards the workpiece during the machining, while the tool moves from a defined diameter to the minimum or maximum diameter.

Still another object of the invention is to provide a tool by means of which it is possible to use a simple hobbing machine to make face gears which are provided with corrections which ensure that the face gear in a gear transmission can mesh in the optimum manner with a cylindrical pinion.

This object is achieved by a tool which during rotation about a first axis of rotation machines by means of the hobbing process a workpiece rotating about a second axis of rotation to form a face gear which can mesh with a cylindrical pinion, in which the face gear is provided with a toothing which is derived from a theoretical pinion profile which rotates about an imaginary axis of rotation and which corresponds to the toothing of the cylindrical pinion with which the face gear can mesh, while the tool is provided with cutting edges which are disposed on an outer periphery of the tool and which are derived from the theoretical pinion profile, and which cutting edges are disposed in such a way that a center point of the cutting edges corresponding to the center of the theoretical pinion profile lies on a circle around the centre point of the tool lying on the first axis of rotation, and the tool follows such a path along the workpiece that the circle always intersects the imaginary axis of rotation with the center points of the cutting edges, wherein each point of the cutting edges of the tool which makes a specific point of the toothing of the face gear is corrected in the direction at right angles to the surface of the cutting edge relative to the theoretical profile corresponding to a desired tooth clearance at the specific point of the toothing.

By including the desired tooth clearance in the profile of the tool, it is possible to make the tool follow a straight path along the workpiece. As a result of this, crowned face gears can be made on simple, and therefore often cheaper, hobbing machines, which can be an attractive solution in particular if a large series of face gears has to be made.

The invention is explained with reference to a drawing, in which an exemplary embodiment of the invention is described.

The drawing comprises the following figures, in which the corresponding parts in each figure are given the same number as far as possible.

BRIEF DESCRIPTIONS OF THE DRAWING

DESCRIPTION OF PREFERRED EMBODIMENTS

Figure 1:
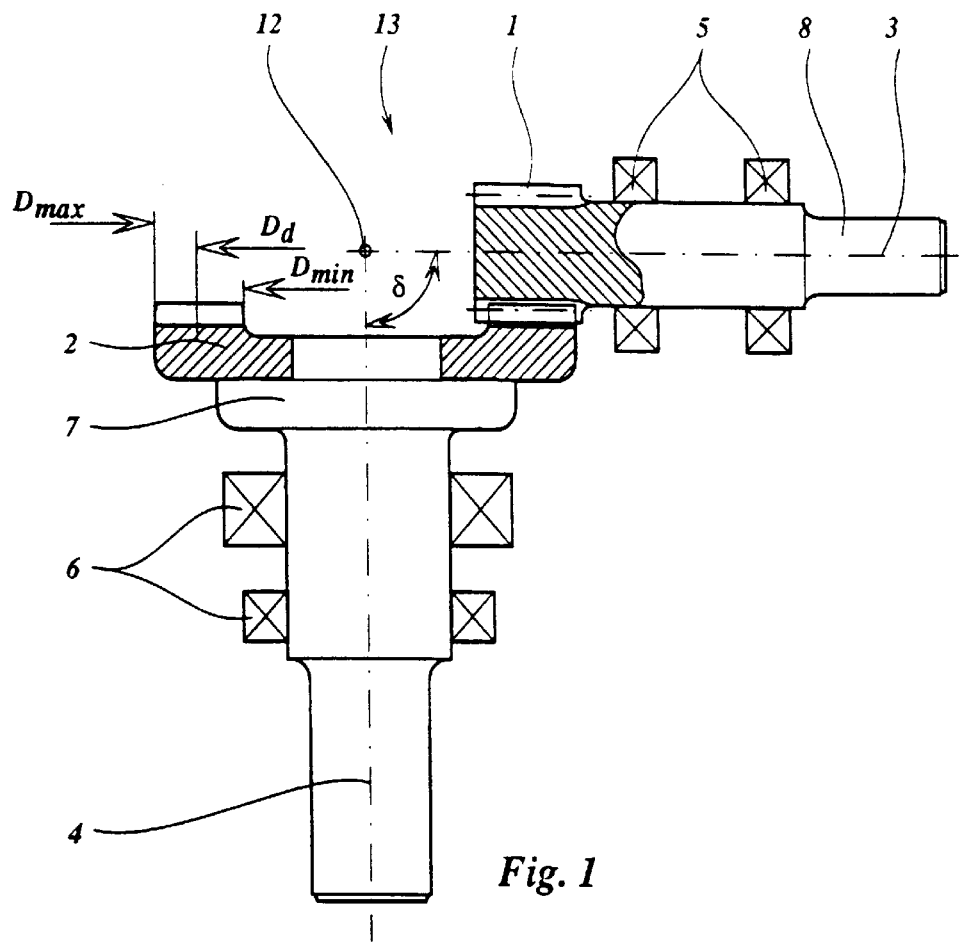
FIG. 1 shows a gear transmission between a shaft provided with a cylindrical pinion and a shaft provided with a face gear, in which the shafts are at right angles to each other and intersect each other.

FIG. 1 shows a gear transmission 13 with a pinion shaft 8 which rotates about an axis of rotation 3, and a face gear shaft 7 which rotates about an axis of rotation 4. The pinion shaft 8 is mounted in bearings 5, and the face gear shaft 7 is mounted in bearings 6.

The gear transmission 13 also comprises a cylindrical pinion 1 which forms part of the pinion shaft 8 and a face gear 2 which is fixed on the face gear shaft 7, the toothing systems of face gear 2 and cylindrical pinion 1 meshing with each other. The toothing of the face gear 2 is limited by a maximum diameter $D_{max}$ and a minimum diameter $D_{min}$, and in the region in which the toothing of the cylindrical pinion 1 and the face gear 2 are meshing there is a defined diameter $D_d$.

This diameter $D_d$ is fixed by the design engineer and lies, for example, halfway along the toothing, but other diameters are also possible, and there can also be a defined region between two defined diameters. This is determined on the basis of the mounting and load situation which occurs.

The axes of rotation 3 and 4 of the meshing gear wheels 1 and 2 intersect each other in an intersection point 12; the axes of rotation form an angle δ with each other in this intersection point 12.

Figure 2:
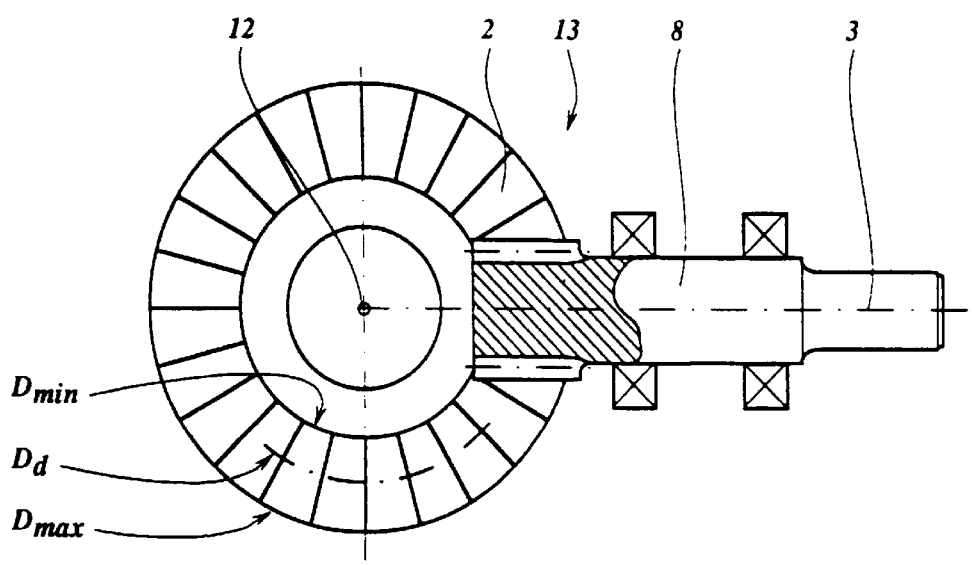
FIG. 2 shows the gear transmission of FIG. 1 in top view.

FIG. 2 shows a top view of the gear transmission 13 shown in FIG. 1.

The gear transmission 13 shown in FIGS. 1 and 2 is designed with intersecting axes of rotation 3 and 4, in which the angle δ between the axes is 90°. It is also possible to design such gear transmissions with the axes of rotation 3 and 4 crossing each other, or in which the angle δ is greater or smaller than 90°.

In the exemplary embodiment shown, the cylindrical pinion 1 is provided with spur toothing, the teeth of which are parallel to the axis of rotation 3, but it is also possible to make the pinion with helical toothing in the known manner, with a now non-zero tooth angle α.

Figure 3:
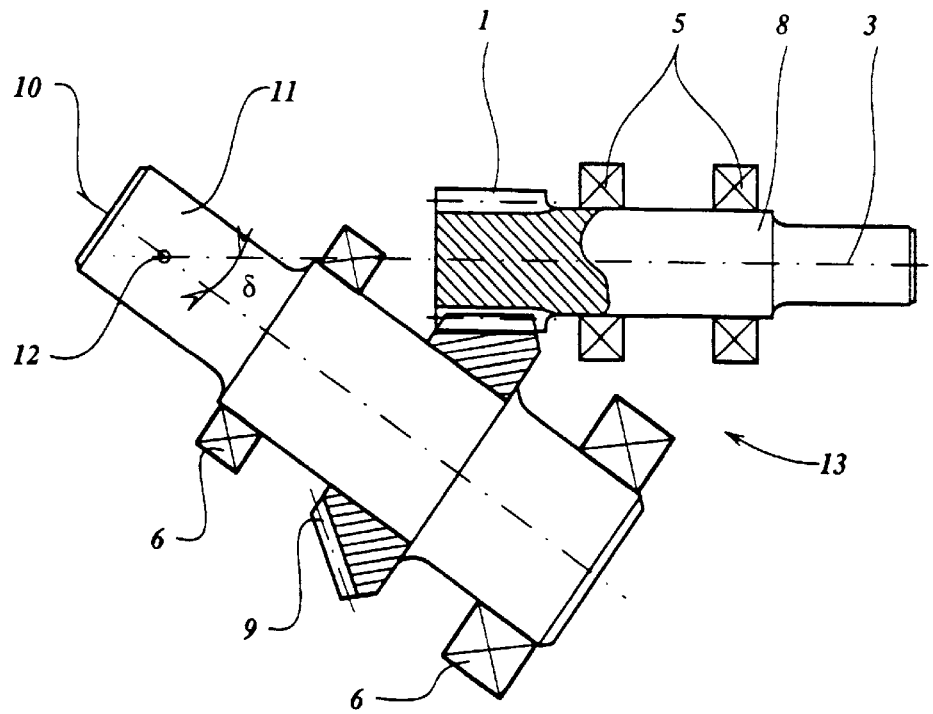
FIG. 3 shows a gear transmission corresponding to FIG. 1, in which the shafts intersect each other at an angle which is less than 90°.

The embodiment of the gear transmission 13 shown in FIG. 3 is designed with the pinion shaft 8 and cylindrical pinion 1 from FIGS. 1 and 2. The axis of rotation 3 of the pinion and a face gear shaft 11 rotating about an axis of rotation 10 intersect each other at an angle which is less than 90°. A conical face gear 9, partly defined by the angle δ, is in mesh with the cylindrical pinion 1.

Figure 4:
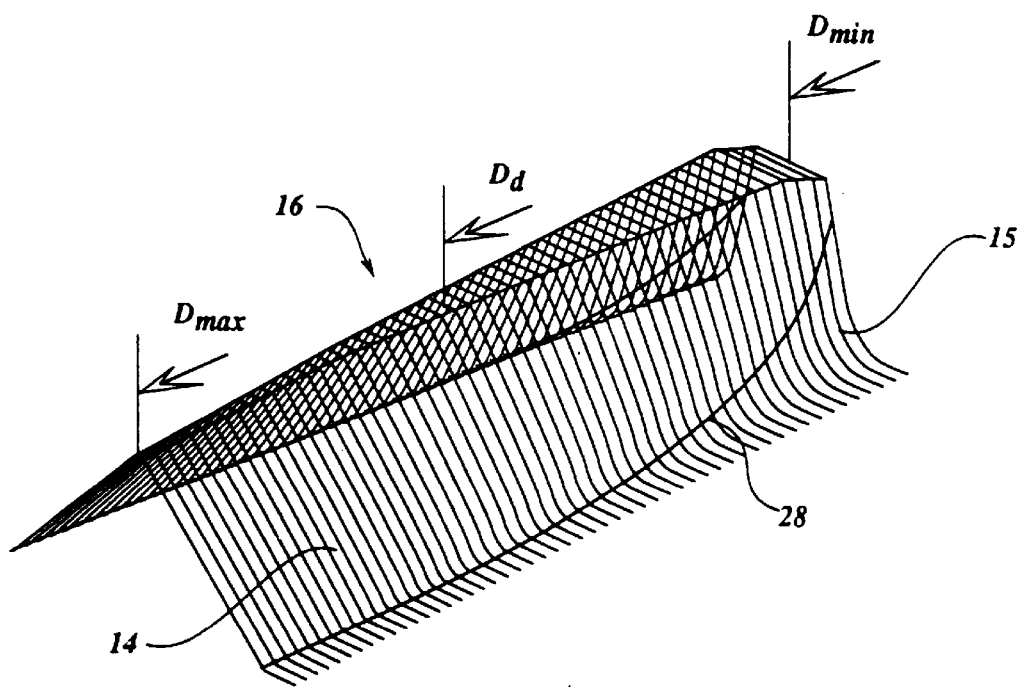
FIG. 4 shows a tooth of a face gear from FIGS. 1–3 in perspective.

FIG. 4 shows in perspective a face gear tooth 16 of the face gear 2 from FIG. 1 or 2 or face gear 9 from FIG. 3. The side edge of the face gear tooth 16 consists of an active flank 14 and a fillet 15. The boundary between the fillet 15 and the active flank 14 is indicated by a line 28.

Figure 5:
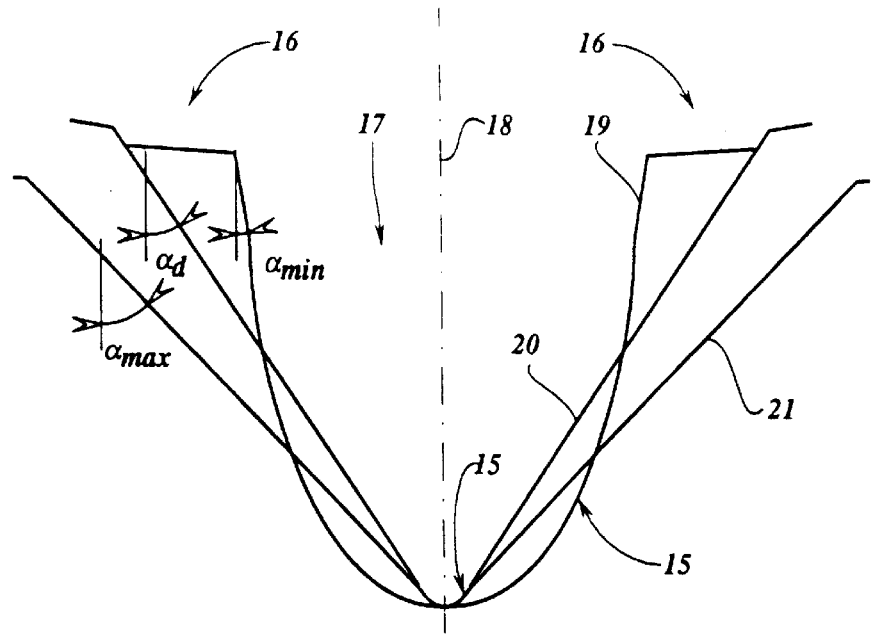
FIG. 5 shows the cross-section of a tooth space of a face gear on the inside and outside diameter and halfway along the tooth space.

FIG. 5 shows a tooth space 17 between two teeth 16 of the type shown in FIG. 4, in cross-section at right angles to the tooth direction. The centre of the tooth space is indicated by a dashed and dotted line 18. The cross-section of the tooth space 17 at the position of the minimum diameter $D_{min}$ is indicated by a line 19, the cross-section of the tooth space 17 at the position of a defined diameter $D_d$ is indicated by 20, and the cross-section at the position of the maximum diameter $D_{max}$ is indicated by 21.

As can be seen in FIGS. 4 and 5, an average angle of inclination of the active flank 14, for example relative to the direction of a plane through the centre of the tooth space 17, differs for the various diameters of the face gear. Said average angle of inclination corresponds to an average pressure angle α by which the toothing of the face gear 2 or 9 comes into contact with the toothing of the pinion 1. At the position of the minimum diameter $D_{min}$ the average pressure angle is $α_{min}$, in, at the position of the defined diameter $D_d$ the average pressure angle is $α_d$, and at the position of the maximum diameter $D_{max}$ the average pressure angle is $α_{max}$. The pressure angles α run, for example, from 0° to 50°, 10° to 45° being usual.

The transition from the active flank 14 to the fillet 15 is also shown in FIGS. 4 and 5. In this case the fillet is greatest at the minimum diameter $D_{min}$.

Figure 6:
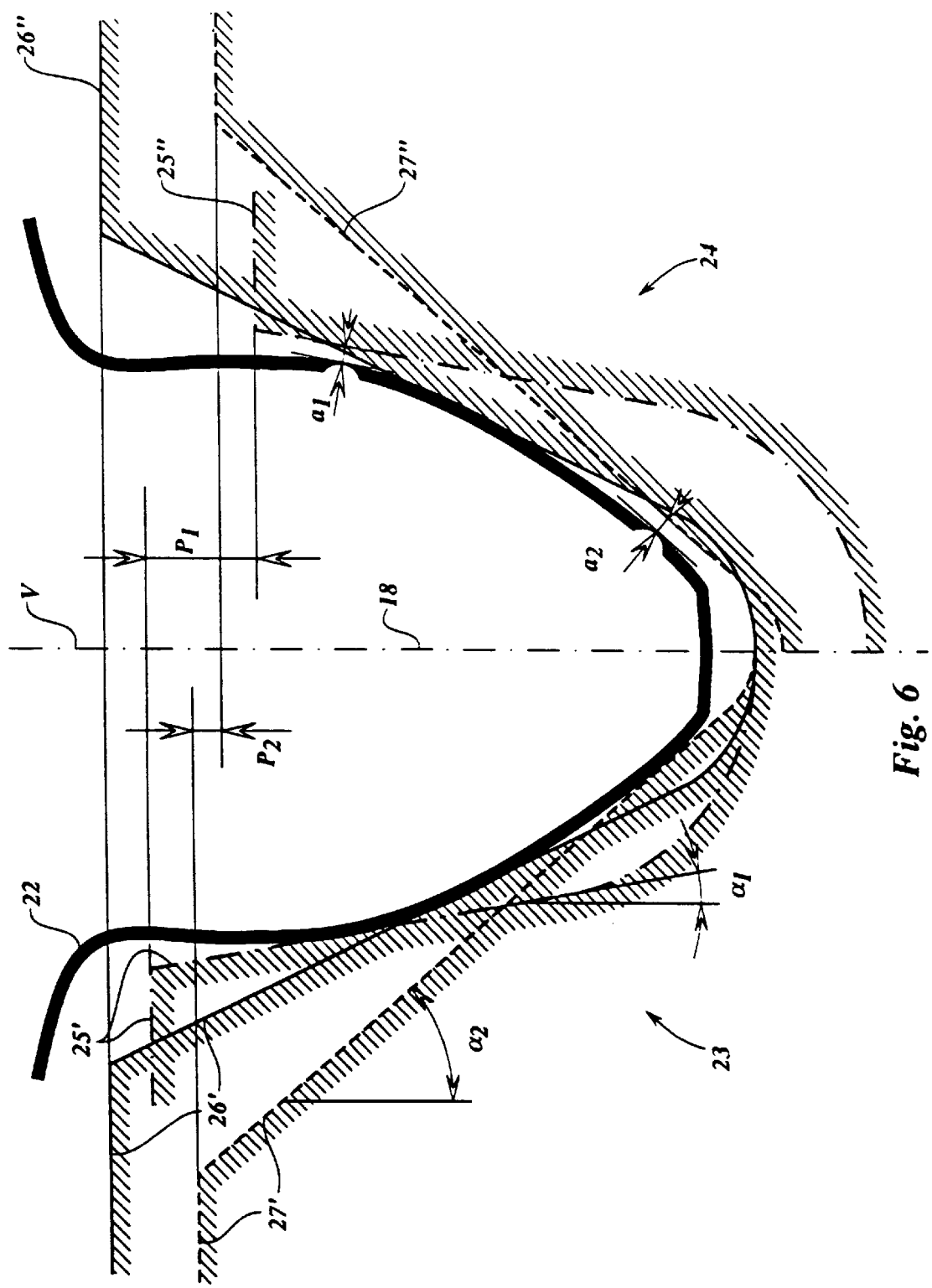
FIG. 6 shows the contact situation between a face gear and the theoretical profile of the cylindrical pinion meshing therewith.

FIG. 6 shows the contact situation between a theoretical pinion profile 22 and a face gear tooth. In this case a view 23 on the left side of FIG. 6 shows the contact between the theoretical pinion profile and a face gear tooth derived therefrom, while view 24 shows the contact between the theoretical pinion profile 22 and an adapted face gear tooth.

For the sake of clarity, the theoretical pinion profile 22 is shown in such a way that the centre of said pinion is placed in the centre of the tooth space, and thus lies on the line 18. A cross-section 25 is the cross-section through the face gear tooth where the tooth flank has an average pressure angle $α_1$, a cross-section 26 is the corresponding cross-section at the position of the defined diameter, and a cross-section 27 is the cross-section through the face gear tooth where the tooth flank has an average pressure angle $α_2$.

In view 23 of FIG. 6 it can be seen that the tooth flanks 25', 26' and 27' contact the theoretical pinion profile 22. Closer analysis teaches that, on rotation of the theoretical pinion 22 with simultaneous rotation of the wheel corresponding to the tooth number ratio of pinion and wheel, these flanks always remain in contact with the theoretical profile 22.

In view 24 of FIG. 6 it can be seen that the adaptations on the face gear tooth are such that only at the position of cross-section 26" is there contact between the face gear tooth and the theoretical profile 22. There is a gap width $a_1$ between cross-section 25" and the theoretical profile 22, and there is a gap width $a_2$ between cross-section 27" and the theoretical profile 22. In order to ensure that there is contact again between the theoretical profile 22 and the face gear tooth cross-section 25" and 27", the profile must be moved down over a distance $p_1$, $p_2$ respectively which is inversely proportional to the sine of the pressure angle α in said cross-section and is proportional to a desired gap width a. It follows from this that $p_1 = a_1/\sin α_1$ and $p_2 = a_2/\sin α_2$.

Due to the fact that in the case of a face gear the average pressure angle α is known approximately for each cross-section, it is possible to achieve any desired gap width, by moving the theoretical profile 22, which is a reference used in the making of a face gear, during the production process in the direction of the centre 18 of the tooth space, in such a way that the desired tooth shape is produced for each cross-section of the face gear. For this purpose, the centre of the theoretical profile 22 is moved in a plane V, in which the axis of rotation of the theoretical pinion lies, and which is parallel to the axis of rotation of the face gear. In FIG. 6 the plane V intersects the plane of the drawing along the line 18.

Figure 7:
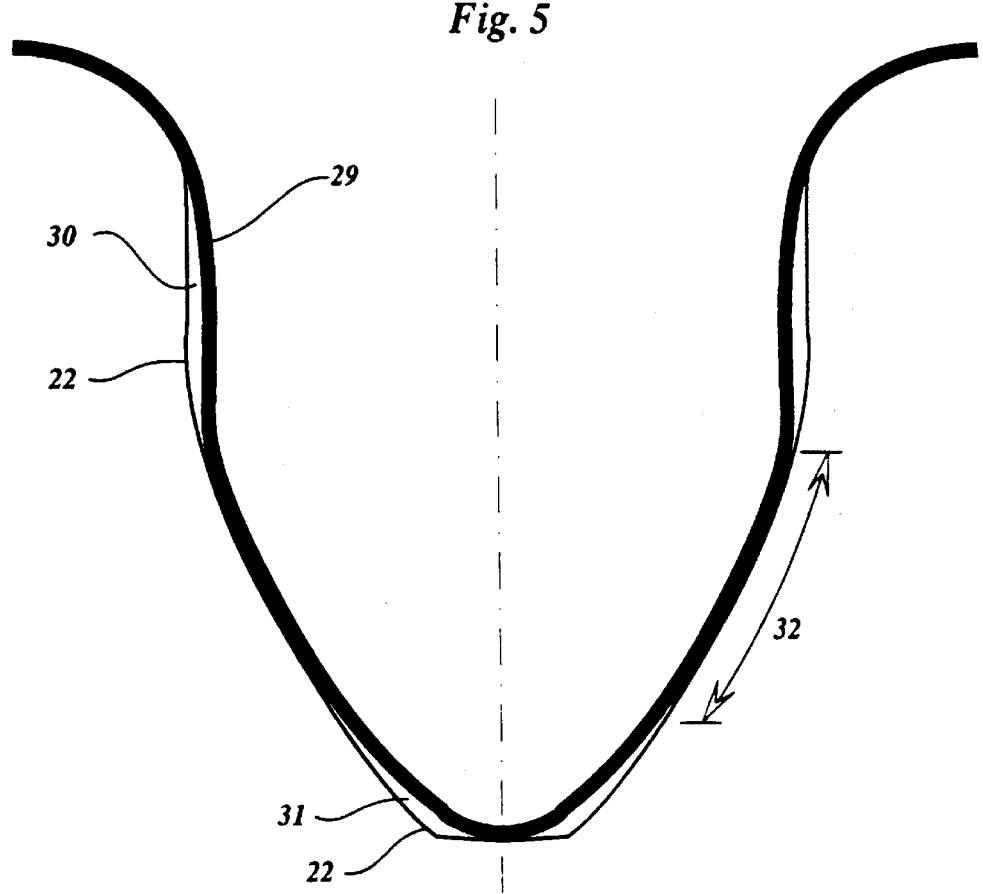
FIG. 7 shows an adaptation to the toothing profile of the pinion meshing with the face gear relative to the theoretical cylindrical pinion shown in FIG. 6.

FIG. 7 shows corrections which can be made to the pinion meshing with the face gear compared with the theoretical profile 22, as a result of which the behaviour of the gear transmission under load improves. A corrected pinion profile 29 is derived from the theoretical pinion profile 22 by making a root correction 30 and a tip correction 31. The corrections 30 and 31 can both be made, and sometimes it is decided to make only one of the two. A part 32 of the tooth flank still has the original pinion profile.

The corrections 30 and 31 are identical for each cross-section in the direction of the axis of rotation of the pinion, with the result that the pinion remains simple to produce. These corrections are simple to make even in the case of helically toothed pinions. Making tip and root corrections ensures that the load on the tooth at the beginning and end of the meshing is raised and lowered, and stress peaks are avoided.

Figure 8:
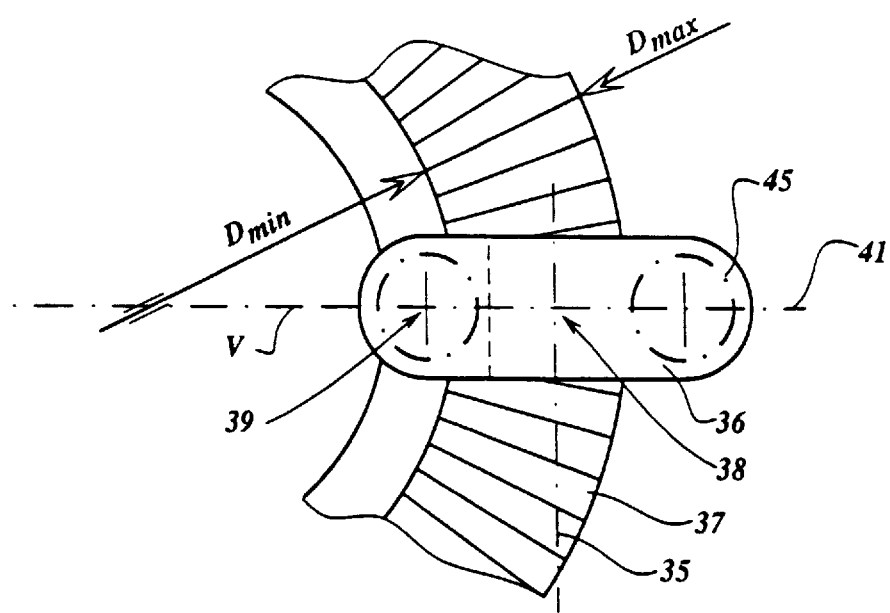
FIG. 8 shows in top view the machining of a face gear by a tool by means of a hobbing process.
Figure 9:
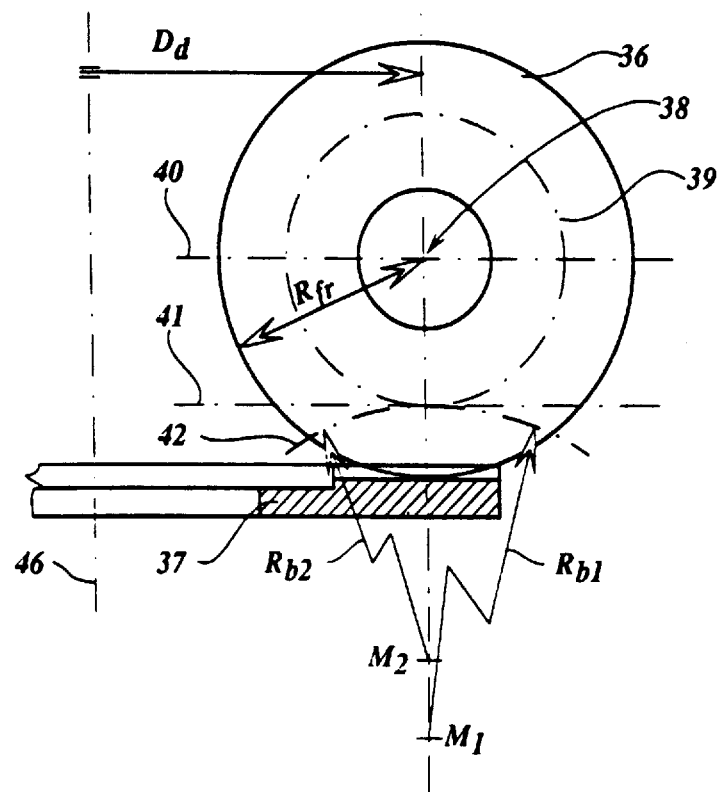
FIG. 9 shows in side view the machining of a face gear by a tool by means of a hobbing process.

FIGS. 8 and 9 show a face gear 37 being machined by means of a gear hobbing tool 36. The gear hobbing tool 36 has an axis of rotation 35, a centre point 38 situated on said axis of rotation 35, and a radius of the outside diameter $R_{fr}$. The tool 36 is provided with a machining profile 45 which has cutting edges, and the shape of which is derived from the shape of the theoretical pinion profile 22, which can mesh with the face gear 37, and the centre of which lies on a circle 39 around the centre point 38.

During the machining of the face gear 37, when the face gear 37 rotates about an axis of rotation 46 and the tool 36 rotates about the axis of rotation 35, the tool 36 moves in such a way that the circle 39 on which the centre points of the machining profile 45 lie is in contact with an axis of rotation 41 of the pinion which meshes with the face gear 37. Said axis of rotation 41 lies in the plane V, which is parallel to an axis of rotation 46 of the face gear 37. In FIG. 9 the plane V corresponds to the plane of the drawing.

In order to provide the face gear 37 with toothing according to the invention, the path of the tool is adapted, and the circle 39 on which the centre points of the machining profile 45 lie will intersect the plane V along a path 42. At the position of a defined diameter $D_d$, the path 42 is in contact with the axis of rotation of the cylindrical pinion 41, and consists of a circular arc with a centre point $M_1$ and radius $R_{b1}$ for that part of the toothing for which the diameter is greater than the defined diameter $D_d$, and of a circular arc with a centre point $M_2$ and a radius $R_{b2}$ for that part of the toothing for which the diameter is smaller than the defined diameter $D_d$.

Due to the fact that the change in the pressure angles of the tooth flanks of the face gear 37 is much greater at the smaller diameter than at the greater diameter, and because the influence of the vertical movement on the inside diameter of the face gear is less than on the outside diameter of the face gear, the radius $R_{b1}$ is greater than the radius $R_{b2}$.

If in the case of face gear 37 $D_{min}$ =146 mm, $D_d$ =182 mm and $D_{min}$, =202 mm, where the pressure angles α run from 10° to 45°, and where the tooth clearance on minimum diameter $D_{min}$ is equal to 0.030 mm and on the maximum diameter $D_{max}$ is equal to 0.020 mm, with the modulus value of the pinion meshing with the face gear being 3 mm and the face gear having 51 teeth, $R_{b1}$ is 1.860 m and $R_{b2}$ is 0.910 m.

Figure 10:
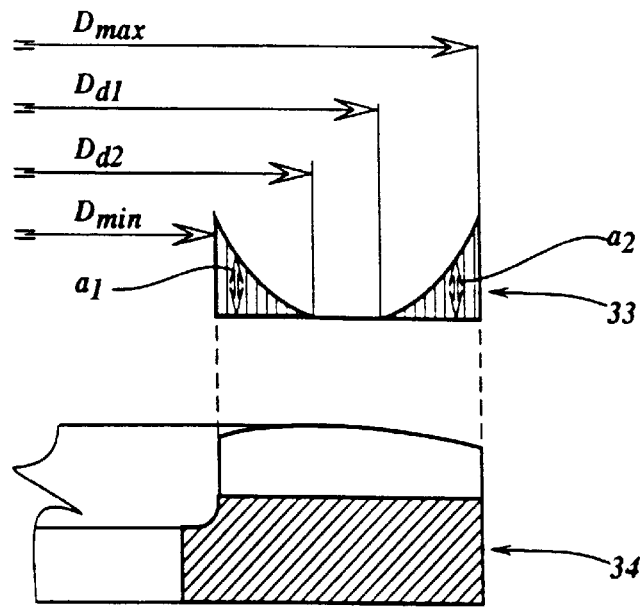
FIG. 10 shows a face gear tooth in section, in which the desired tooth clearance is also indicated as it varies over the tooth width.

FIG. 10 shows a cross-section of a face gear 34 having above it a graph 33 of the desired curve of the tooth clearance $a_1$ or $a_2$ between the flanks of the face gear 34 and a theoretical pinion which meshes with the face gear. The toothing of the face gear 34 has a minimum diameter $D_{min}$ and a maximum diameter $D_{max}$. From $D_{min}$ up to a defined diameter $D_{d2}$ the tooth clearance runs according to a value $a_1$, and from a defined diameter $D_{d1}$ up to the maximum diameter $D_{max}$ the tooth clearance runs according to a value $a_2$. Between the two defined diameters $D_{d1}$ and $D_{d2}$ there is theoretically no tooth clearance.

Figure 11:
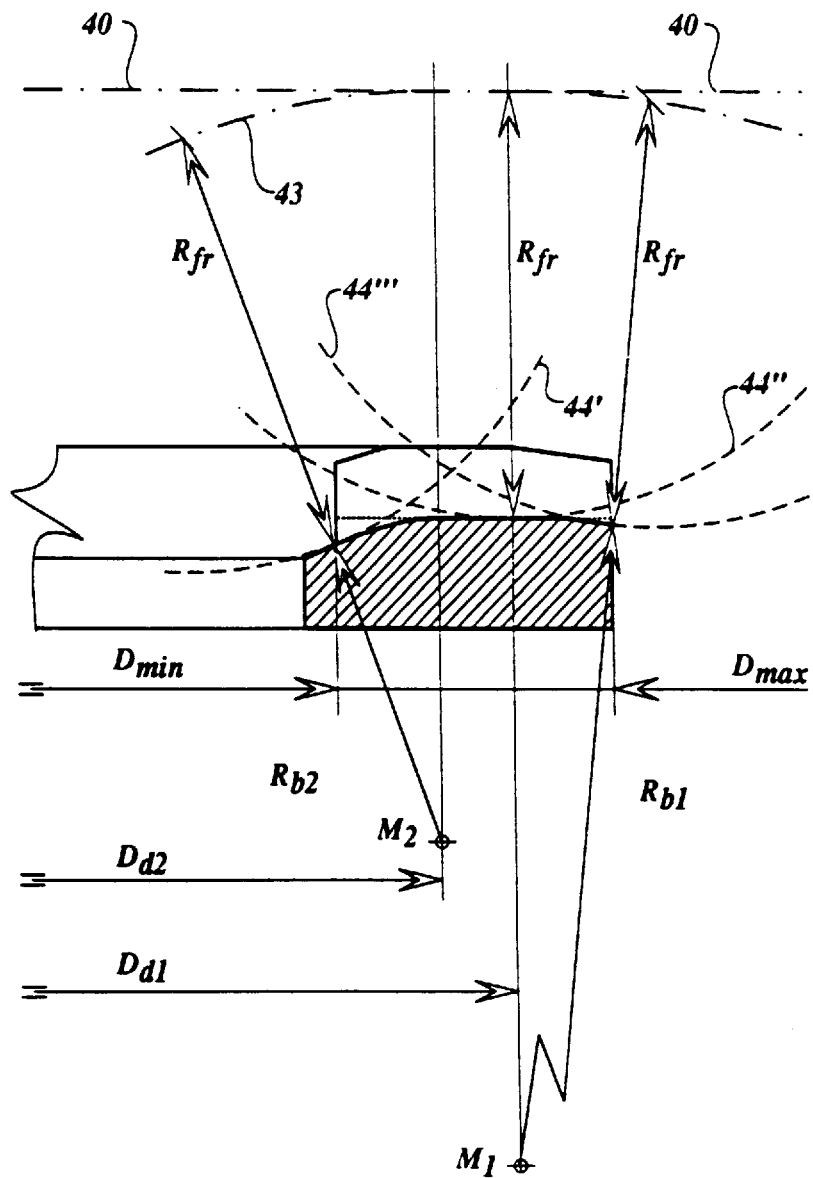
FIG. 11 shows the movement of the hobbing tool by means of which the tooth clearance shown in FIG. 10 can be achieved.

FIG. 11, in which, as in FIG. 9, the plane of the drawing corresponds to plane V, shows how the desired curve of the tooth clearance in FIG. 10 can be achieved. For this purpose, the centre point 38 of the gear hobbing tool 36 with radius $R_{fr}$ and a periphery 44 is moved along a path 43. Where there is no tooth clearance, between the two defined diameters $D_{d1}$ and $D_{d2}$ the path 43 corresponds to the unadapted path 40. During the machining of the toothing with a diameter which is smaller than a defined diameter $D_{d2}$ the centre point 38 follows an arc with radius $R_{fr}+R_{b2}$ connecting to the straight path 40, and correspondingly during the machining of the toothing which is greater than the defined diameter $D_{d1}$ the centre point 38 follows an arc with radius $R_{fr}+R_{b1}$ connecting to the straight path 40. Each arc has a centre point $M_2$ and $M_1$ respectively.

During the machining of a face gear with 51 teeth which meshes with a pinion with a modulus m=3 mm, $D_{min}$=146 mm, $D_{max}$=202 mm, use is made of a tool with $R_{fr}$ =133 mm. It is desirable to apply a maximum tooth clearance of 0.03 mm to the minimum and maximum diameter. Between the diameter $D_{d1}$=185 mm and $D_{d2}$ =156 mm the tooth clearance is zero. It now appears that in order to obtain the desired tooth clearance for the arc radii the following values have to be maintained: $R_{b1}$=860 mm and $R_{b2}$ =77 mm.

The machining with a hobbing tool comprises both hobbing cutting and hobbing grinding. The invention can also be used for face gears which mesh with cylindrical pinions with spur toothing, or with helically toothed pinions. The shape of the face gears, as determined by the number of teeth of the pinion and the number of teeth of the face gear, the axial angle between the axes of rotation of pinion and face gear and the distance between said axes have no influence either. The invention can always be used in a corresponding manner.

In addition to the method described above for making a face gear according to the invention, it is also possible to adapt the shape of the hobbing tool. This results in a method in which the centre of the tool is moved in a straight path, for example corresponding to the path 40 shown in FIG. 11. The desired shape of the face gear is then achieved by giving the machining profile of the tool, for example as indicated by 45 in FIG. 8, such a shape that the desired toothing is produced.

The shape of the tool is adapted here in such a way that the desired corrections for each pressure angle are incorporated in the shape of the cutting edge. Since each point of the tool makes only one point of each face gear tooth, the necessary corrections can be calculated and made in the known manner in the tool.

Figure 12:
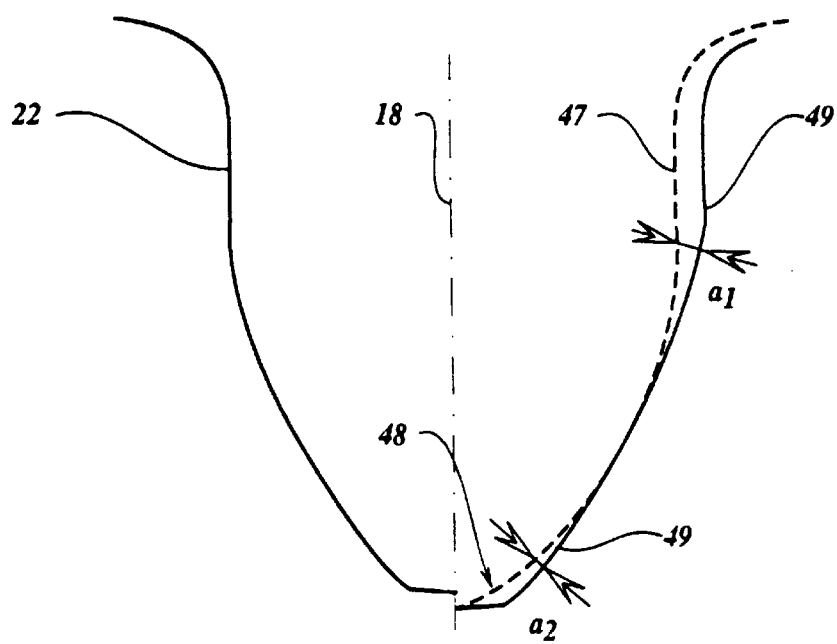
FIG. 12 shows the section of a tooth of the machining profile of an adapted hobbing tool.

FIG. 12 shows what corrections have to be made to the illustrated tooth of, for example, a cutter profile. Here, a centre tooth of the machining profile of the hobbing tool is shown, in this case the centre of the theoretical pinion profile 22 lying on the axis 18 of the tooth. The theoretical pinion profile 22 is shown on the left side; a machining profile 47, indicated by a dotted line, is derived from this theoretical profile. This machining profile 47 corresponds roughly to the theoretical profile 22, but it has a greater tip height and has a fillet radius 48 at the tip. An adapted machining profile 49 is adapted in such a way that with a small pressure angle additional material with a thickness of $a_1$ is removed by the tool, and with a large pressure angle additional material with a thickness of $a_2$ is removed.

We claim:

1. Gear transmission for coupling in a fixed ratio a rotation of a first axis of rotation to a rotation of a second axis of rotation; the first axis of rotation and the second axis of rotation forming an angle δ with each other, by means of a cylindrical pinion disposed on the first axis of rotation and having a tooth angle, and a face gear disposed on the second axis of rotation and meshing with the cylindrical pinion, said face gear being provided with a toothing which runs from a minimum diameter $D_{min}$, where the toothing has a profile with a minimum pressure angle $\alpha_{min}$, to a maximum diameter $D_{max}$, where the profile has a maximum pressure angle $\alpha_{max}$, and which toothing is derived from a theoretical profile of an infinitely thin cross-section by moving a centre point of said profile along an imaginary axis of rotation, corresponding to the first axis of rotation, in a plane which comprises the imaginary axis of rotation and which is parallel to the according to an angle which follows from said movement and the tooth angle β of the pinion, and in which, if the toothing of the pinion and the toothing of the face gear rest against each other at the position of a defined diameter $D_d$ of the face gear, a first tooth clearance ($a_1$) occurs between said toothing systems at the position of the minimum face gear diameter $D_{min}$, and a second tooth clearance ($a_2$) occurs at the position of the maximum face gear diameter $D_{max}$, wherein the tooth clearance occurs due to the fact that the shape of the toothing of the face gear is adapted in such a way that when the infinitely thin theoretical pinion profile which is in mesh with the toothing of the face gear is moved in the direction of the imaginary axis of rotation, starting from the defined diameter $D_d$, the centre point of the theoretical pinion profile undergoes a displacement at the same time in the plane at right angles to the imaginary axis of rotation in the direction towards the toothing of the face gear.

2. Gear transmission according to claim 1, wherein the displacement of the theoretical pinion profile during movement from the defined diameter $D_d$ to the maximum diameter $D_{max}$ of the face gear is approximately 1/sin ($\alpha_{max}$) times the second tooth clearance ($a_2$), and during movement to the minimum diameter $D_{min}$ of the face gear is approximately 1/sin ($\alpha_{min}$) times the first tooth clearance ($a_1$).

3. Gear transmission according to claim 2, wherein the first tooth clearance ($a_1$) is approximately the same as the second tooth clearance ($a_2$).

4. Gear transmission according to claim 1, wherein the toothing of the cylindrical pinion meshing with the face gear in the direction of its axis of rotation has a constant profile which is derived from the theoretical pinion profile on which, inter alia, a tip correction and/or a root correction has been made.

5. Face gear which can mesh with a cylindrical pinion with a tooth angle, said face gear being provided with a toothing which runs from a minimum diameter $D_{min}$, where the toothing has a profile with a minimum pressure angle $\alpha_{min}$, to a maximum diameter $D_{max}$, where the toothing has a profile with a maximum pressure angle $\alpha_{max}$, and which toothing is derived from a theoretical pinion profile rotating about an imaginary axis of rotation and corresponding to the toothing of the cylindrical pinion with which the face gear can mesh, wherein the shape of the toothing of the face gear is such that an infinitely thin cross-section of the theoretical pinion profile remains in mesh with the toothing if the centre of said theoretical pinion profile lying on the imaginary axis of rotation moves in a plane (V), in which the imaginary axis of rotation lies and which is parallel to the axis of rotation of the face gear, from the position at which meshing at a defined diameter $D_d$ on the face gear occurs in the direction of the imaginary axis of rotation, and during that rotates through an angle corresponding to said movement, which angle is determined by the movement and the tooth angle, and at the same time moves over a distance ($p_1$, $p_2$) in the direction towards the toothing of the face gear at right angles to the imaginary axis of rotation.

6. Face gear according to claim 5, wherein the distance ($p_1$, $p_2$) during the movement from meshing at the defined diameter $D_d$ to the minimum diameter $D_{min}$ is approximately 1/sin ($\alpha_{min}$) times a desired tooth clearance ($a_1$) at the minimum diameter $D_{min}$, and during movement to the maximum diameter $D_{max}$ of the face gear is approximately 1/sin ($\alpha_{max}$) times a desired tooth clearance ($a_2$) at the maximum diameter $D_{max}$.

7. Face gear according to claim 6, wherein the desired tooth clearance ($a_1$) at the minimum diameter $D_{min}$ is approximately the same as the desired tooth clearance ($a_2$) at the maximum diameter $D_{max}$.

* * * * *